Nov. 3, 1964 G. MAI 3,155,237
ARRANGEMENT FOR MEASURING THE TEMPERATURE OF AN
EXTRUSION DURING THE MANUFACTURE THEREOF
Original Filed Dec. 28, 1959 2 Sheets-Sheet 2 ically with the extrusion material 23 which in the illustrated example is an aluminum alloy, as pointed
United States Patent Office 3,155,237
Patented Nov. 3, 1964

3,155,237
ARRANGEMENT FOR MEASURING THE TEMPERATURE OF AN EXTRUSION DURING THE MANUFACTURE THEREOF
Gerhard Mai, Meinerzhagen, Westphalia, Germany, assignor to Otto Fuchs Kommandit-Gesellschaft, Meinerzhagen, Westphalia, Germany
Continuation of application Ser. No. 862,217, Dec. 28, 1959. This application Nov. 12, 1963, Ser. No. 325,200
Claims priority, application Germany, Dec. 27, 1958, F 27,377; Nov. 23, 1959, F 29,903
8 Claims. (Cl. 207—16)

The present invention relates to extrusions and in particular to the manufacture thereof.

The present application is a continuation of my co-pending application Serial No. 862,217, filed December 28, 1959, entitled "Arrangement for Measuring the Temperature of an Extrusion," and now abandoned.

It is known that in order to obtain high quality extrusions the temperature of the extrusion material must be closely regulated during the extrusion of this material. Thus, it is desirable to maintain the temperature of the extrusion material during the extrusion thereof very close to that temperature at which the extrusion material, or in the case of an alloy the component thereof with the lowest melting point, will start to melt. Thus, it is desirable in the case of an alloy, for example, to maintain the extrusion temperature within 10–30° C. below that temperature at which the component of the alloy of lowest melting point will start to melt.

Of course, once the temperature is accurately measured it is not too difficult to maintain the extrusion material at the desired temperature simply by controlling the rate of extrusion thereof.

However, considerable difficulty is encountered in accurately measuring the temperature of the extrusion material during the extruding thereof. For example, it has been proposed to place in engagement with the extrusion material during the extrusion thereof a thermocouple structure which will give a temperature indication, but this engagement is brought about by placing rolls or a spring element or the like in engagement with the exterior surface of the extrusion, and since a certain pressure is required to provide the desired accurate temperature reading, it is almost impossible to take a measurement in this way without damaging the surface of the extrusion undesirably. Furthermore, the known measuring devices are rather bulky and because of their own mass do not give accurate temperature readings. Moreover, it has proved in practice that in taking the measurements of the temperature what is actually arrived at is a more or less average temperature of the extrusion material instead of the critical highest temperature thereof.

It is accordingly one of the objects of the present invention to overcome the above drawbacks by providing an apparatus which will give an accurate indication of the highest temperature of the extrusion material during the extruding thereof.

Another object of the present invention is to provide an apparatus which is extremely simple while at the same time operating very reliably to produce the desired results.

With the above objects in view the invention includes in an apparatus for measuring the temperature of an extrusion during the manufacture thereof, an extrusion means for extruding an electrically conductive material. The first thermocouple element is located at one end closely adjacent to the extrusion material at a part thereof which passes through an extruding die of the extrusion means, and this thermocouple element has a free end distant from the extrusion means. An electrical conductor is directly in engagement with the extrusion material and also has a free end distant from the extrusion means, and a means is connected electrically with the free end of the conductor and the free end of the first thermocouple element for indicating the temperature of the extrusion material at the region where it is located next to the first thermocouple element. It will be seen that with this arrangement it is the extrusion material itself which forms the second thermocouple element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
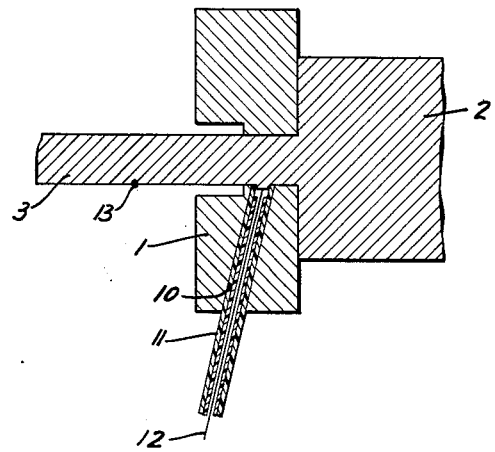
FIG. 1 is a fragmentary, diagrammatic, longitudinal section of an extrusion material shown being extruded, FIG. 1 illustrating how one thermocouple element is incorporated into the assembly.
Figure 2:
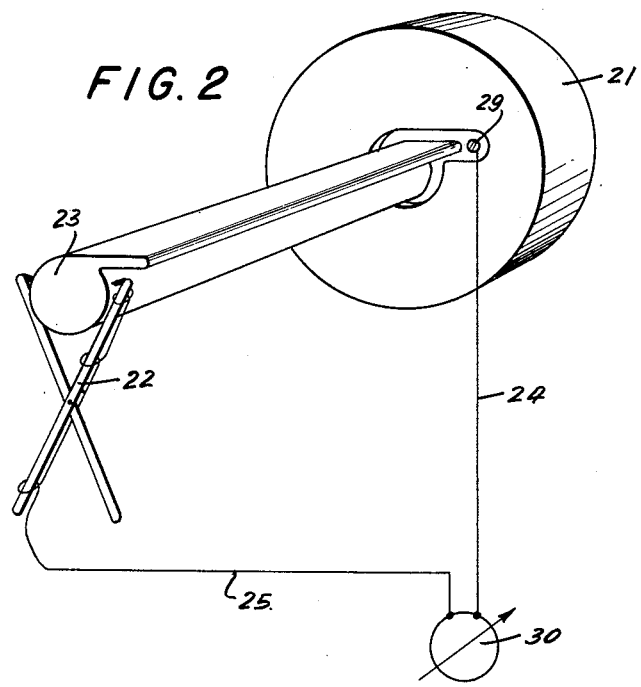
FIG. 2 is a perspective illustration of the extruding die and the extrusion issuing therefrom, FIG. 2 showing in a partly diagrammatic manner the manner in which the thermocouple elements are electrically connected together.

Referring now to the drawings and to FIG. 2 in particular, it will be seen that a die 21 of an extrusion means is shown in FIG. 1 with the extrusion 23 issuing forwardly from the extrusion die 21. This extrusion material 23 may be an aluminum alloy, for example. In order to determine the highest temperature of the material 23 during the extrusion thereof it is necessary to arrange the temperature measuring structure so that it will detect the temperature of the extrusion 23 at the point where its temperature is highest, and then, as was pointed out above, the extrusion will be carried out in such a way that the extrusion material is maintained very close to the maximum possible temperature. Where the cross section of the extrusion varies, as indicated in FIG. 2, the highest temperature will occur at that part of the extrusion where its thickness is at a minimum and where the extrusion just issues from the die 21. In accordance with the present invention one element 24 of a thermocouple is fixed by a fastening means in the form of a screw 29 to the die 21 closely adjacent to the die orifice portion at which the part of the extrusion 23 of smallest thickness issues. In the illustrated example the thermocouple element 24 is in the form of a copper wire whose one end is fixed by the screw 29 to the die very closely adjacent to the part of the die orifice through which the extrusion portion of smallest thickness flows, and it will be seen that the thermocouple element 24 has a free end distant from the extrusion means which includes the die 21.

An electrical conductor 25 is connected electrically with the electrically conductive extrusion material 23 which in the illustrated example is an aluminum alloy, as pointed out above. In order to connect the conductor 25 electrically with the extrusion 23 a gripping tongs is used, and as shown in FIG. 2 the tongs 22 grip the one end of the conductor 25 together with the extrusion 23 at its leading end so that through the tongs 22 the conductor 25 is connected electrically with the extrusion 23. It will be noted that the conductor 25 also has a free end distant from the extrusion 23. A temperature indicating means 30 is connected with the free ends of the thermocouple element 24 and the conductor 25, and this means 30 may be in the form of a galvanometer, for example, whose pointer can directly indicate temperature.

It will be seen that with this arrangement the extrusion material 23 itself forms the second element of the thermocouple.

As is well known, a thermocouple is composed of a pair of conductors joined at their ends and where there is a temperature difference between the two junctions of the conductors of different materials an electromotive force will be generated, and this is what is measured by the galvanometer 30 which directly indicated the temperature. Of course, in the example illustrated in FIG. 2 there is an extremely small amount of the material of the die 21 itself located between the thermocouple element 24 and the extrusion material, so that actually what is measured in the embodiment of FIG. 2 is the temperature of the die 21 at the extremely small portion thereof which is located between the screw 29 and the extrusion material 23. However, inasmuch as the temperature of this extremely small portion of the die 21 is in fact the same as the temperature of the extrusion 23 which it directly contacts, it is clear that the means 30 will provide an accurate indication of the temperature of the extrusion material precisely at the point where this temperature is highest.

It should be noted that the thermocouple illustrated in FIG. 2 departs slightly from a classic thermocouple in that the element 24 is not directly in engagement with the other thermocouple element 23. However, it is known, for example, that when a pair of thermocouple elements are immersed in a bath of molten metal in order to determine the temperature thereof, the temperature at the junction of the two thermocouple elements is not actually measured in this instance. What is actually measured is the temperature of the molten metal bath at a point closely adjacent to the surface of the bath, since the electrical current obviously follows the line of least resistance and therefore the circuit is between the pair of thermocouple elements at the portion thereof closely adjacent to the surface of the molten metal bath. Thus, in the case of FIG. 2 the measurement is of the temperature of the material of the die 21 between the screw 29 and the edge of the extrusion 23 where the latter is of smallest thickness. It is known, for example, to measure the temperature of the surface of the metal block by using a pair of thermocouple elements which are in fact sharply pointed metal members spaced slightly from each other and piercing the surface of the block to obtain a measurement thereof, so that in a device of this latter type also there is no direct engagement between the ends of the thermocouple elements.

Inasmuch as the thermocouple operates on the principle of generating the electromotive force as a result of the difference between the temperatures at the two junctions of the pair of thermocouple elements, it is clear that an accurate reading of the desired temperature with the embodiment of FIG. 2 requires that the temperature at the galvanometer 30 be constant. It is for this reason that the conductor 25 is used. If the galvanometer 30 were located, for example, at the leading end of the extrusion 23 connected electrically with the latter, then the temperature at the junction distant from the screw 29 would vary considerably because of the continuous cooling of the leading end of the extrusion, and it would be impossible to obtain an accurate reading. However, by using conductor 25 it is possible to maintain the function at the galvanometer 30 at a substantially constant temperature and thus an accurate reading would be obtained. The material of the conductor 25 may be the same as the material of the extrusion 23. However, if desired the material of the conductor 25 may be different from that of the extrusion 23 but in this event it sould behave the same as the material of the extrusion 23. Thus, it is known, for example, that where a thermocouple includes a platinum element and a platinum-rhodium element, a copper alloy wire corresponding to the conductor 25 may be used since it has thermoelectric properties similar to that of the thermocouple elements. In the same way, any wire 25 whose material has the same thermoelectric properties as the material of the extrusion 23 may be used.

In FIG. 1 there is shown an embodiment which differs from that of FIG. 2 only in that with the embodiment of FIG. 1 there is in fact direct contact between the pair of thermocouple elements. Thus, referring to FIG. 1 it will be seen that the extrusion material 2 moves through the extrusion die 1 to form the extrusion 3. The die 1 is formed with a bore 10 receiving a tube 11, and the thermocouple element 12, which corresponds to the thermocouple element 24 of FIG. 2, passes through and is insulated from the tube 11. The thermocouple element 12 terminates extremely close to the inner end of the bore 10 very close to the inner surface of the die 1 along which the extrusion material flows, and with this arrangement a part of the extrusion material will move into the bore 10 and will directly engage the thermocouple element 12 so as to enable the desired temperature to be indicated in the same way as described below in connection with FIG. 2. Thus, the thermocouple element 12 at its end distant from the extrusion means 1 will be connected with a means 30 or the like for indicating the temperature, and a conductor similar to the conductor 25 of FIG. 2 will be connected through a tongs 22 or the like to the extrusion 3 so as to complete the circuit, this extrusion 3 itself forming the second thermocouple element. Of course, where the extrusion 3 has an irregular cross section, the inner end of the bore 10 is located at a part of the die which will produce the smallest cross sectional thickness of the extrusion 3.

Of course, with an arrangement as shown in FIGS. 1 and 2, bearing in mind that the reading at the instrument 30 will be influenced by the resistance of the circuit itself, a false reading may be obtained because the extrusion 23 is constantly increasing in length and thus introducing additional resistance constantly into the circuit. However, all that is required is to use at the instrument 30 a rotor of high resistance in relation to the total resistance of the circuit itself, so that any possible increase in the resistance resulting from the increased length of the extrusion 23 will be so small in comparison to the resistance of the rotor of the instrument 30 that the increasing resistance produced by the increasing length of the extrusion 23 can simply be ignored.

Instead of a tongs 22, it is possible to provide a carriage which will roll along the base of the machine or the floor which carries the extrusion means, and such a carriage may be connected with the leading end of the extrusion 23 and may serve to maintain the flexible elongated conductor 25 electrically connected with the extrusion 23.

The advantage of the structure of the invention can be readily appreciated with reference to the point 13 illustrated in FIG. 1. If a thermo-element of a thermocouple is placed at the point 13, as is often done in practice, then of course there will be a more or less substantial distance between the point at which the temperature measurement is made and the discharge end of the die. Thus, it will be impossible to obtain at the point 13 the maximum temperature of the material in the die even if the point 13 is taken at the part of the extrusion which has the smallest thickness. It is the part of the material of smallest thickness at the discharge of the die itself which is at the highest temperature and this is the critical temperature which should be determined, and by taking a reading at the point 13 there has been such a drop of temperature from the die to the point 13 that it is impossible to determine what the actual temperature of the extrusion material is at the critical point where it issues from the die. Of course, it is also possible to measure the temperature by utilizing the radiation from the extrusion at the region 13 thereof, but tests have shown that when using this temperature measuring method also there is very little accuracy. It is almost impossible to obtain a precise relationship between the temperature obtained from radiations at the region 13 and the maximum temperature of the extrusion material in the die itself. Inasmuch as it is known that the radiation factor of steel is approximately 0.8 and that of aluminum approximately 0.3, then during the extrusion of aluminum or aluminum alloy, for example, the radiation of the aluminum or aluminum alloy extrusion material is super-imposed on radiations from the extrusion die and even from the billet receiver of the extrusion apparatus, so that false readings are obtained. Under these circumstances, a measurement of radiations from the extrusion do not give an accurate indication of temperature in the die and of course the further away the measurement is made from the die the greater are the possible errors.

Figure 4:
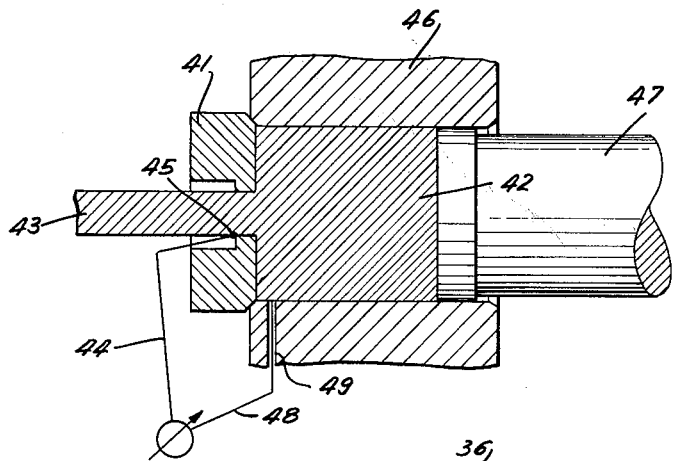
FIG. 4 is a diagrammatic longitudinal fragmentary section of another embodiment of an arrangement according to the invention for indicating the temperature of the extrusion material during the extrusion thereof.
Figure 3:
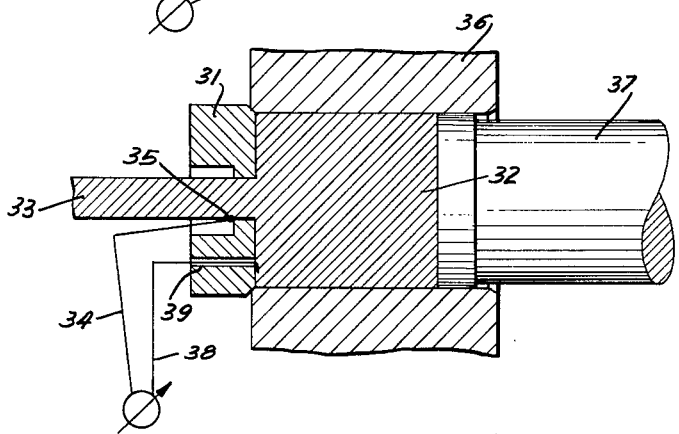
FIG. 3 is a longitudinal, fragmentary, diagrammatic section illustrating the extrusion means together with the extrusion material and the structure for indicating the temperature thereof, the embodiment of FIG. 3 differing from that of FIG. 2.
Figure 5:
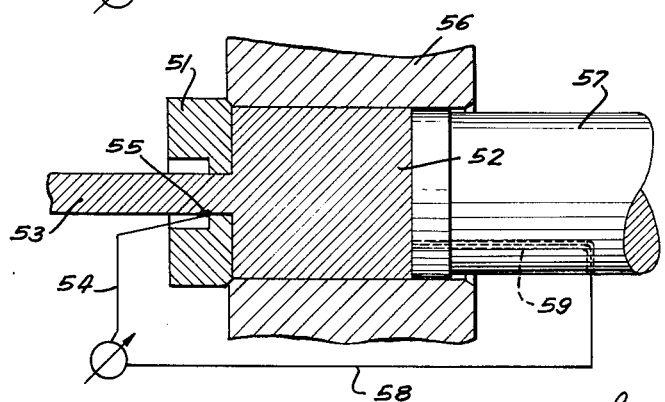
FIG. 5 is still another embodiment of a structure for indicating the temperature of the extrusion material during the extrusion thereof.

Inasmuch as the connection of the flexible conductor 25 to the leading end of the extrusion 23 creates some difficulties, arrangements such as those illustrated respectively in FIGS. 3–5 may be used to obviate this difficulty.

Thus, referring to FIG. 3 it will be seen that an extrusion apparatus or means which includes the die 31, the billet receiver 36, and the ram 37 is provided. The extrusion material includes the billet 32 which is originally placed within the billet receiver 36, the ram 37 advancing to the left, as viewed in FIG. 3, so as to cause the extrusion material 32 to flow through the die 31 and form the extrusion 33. The first thermocouple element 34 is shown in FIG. 3 diagrammatically connected to the apparatus at 35. At the region 35 the connection may be either that shown in FIG 1 for the thermocouple element 12 or that shown in FIG. 2 for the thermocouple element 24. The instrument 40 may be the same as the instrument 30, and in accordance with the embodiment of FIG. 3 the conductor 38 extends from the instrument 40 through a bore 39 with the free end of the conductor 38 located directly in the billet receiver 36 so as to be directly engaged by the extrusion material 32, and thus with this embodiment the extrusion material 32, 33 will also form the second thermocouple element which cooperates with the thermocouple element 34 to indicate at the instrument 40 the temperature of the material 32, 33 in the die 31.

With the embodiment of FIG. 4 the extrusion means includes the die 41, the billet receiver 46 and the ram 47. The billet 42 within the receiver 46 is extruded through the die 41 to form the extrusion 43 by advancing of the ram 47 to the left, as viewed in FIG. 4. The instrument 50 of FIG. 4 corresponds to the instrument 30 of FIG. 2 and is connected to one end of the thermocouple element 44 whose opposite end is connected at 45 to the extrusion means in such a way that this thermocouple element 44 is connected either in the same way as the thermocouple element 24 or in the same way as the thermocouple element 12. With the embodiment of FIG. 4 it is the wall of the receiver 46 which is formed with a bore 49, and the conductor 48 extends from the instrument 50 through the bore 49 into the interior of the receiver 46 so as to be in direct engagement with the material 42 within the receiver 46 and thus complete the circuit so as to provide at the instrument 50 the desired temperature indication.

In the embodiment of the invention which is illustrated in FIG. 5 the extrusion means again includes the die 51, the billet-receiver 56 and the ram 57. The extrusion billet 52 is placed within the receiver 56 and is extruded through the die 51 while the ram 57 advances to the left, as viewed in FIG. 5, thus producing the extrusion 53. The first thermocouple element 54 is connected at its outer free end to the instrument 60 which corresponds to the instrument 30, and at 55 the thermocouple element 54 is assembled with the rest of the apparatus either in the manner illustrated for the thermocouple element 24 of FIG. 2 or in the manner illustrated for the thermocouple element 12 of FIG. 1. With the embodiment of FIG. 5 it is the ram 57 itself which is formed with a bore 59 part of which extends axially or parallel to the axis of the ram 57 and part of which extends radially thereof to the exterior surface of the ram 57, the conductor 58 passing through this bore 59 and terminating at the left end face of the ram 57 so as to be in direct engagement with the extrusion material 52, the outer free end of the conductor 58 being connected with the instrument 60, so that in this way with embodiment of FIG. 5 there will also be provided a circuit in which the extrusion material 52, 53 itself forms the second thermocouple element.

The insulating tube 11 of FIG. 1 is in the form of a tube of any suitable material which provides electrical insulation.

It will be understood that each of the elements described above, or two or more together, may also find a useful application in other types of extrusion apparatus differing from the types described above.

While the invention has been illustrated and described as embodied in the temperature measurement arrangement for extrusions, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of the prior art, fairly constitute essential characteristics of the generic or specific aspects of this invention and, therefore, such adaptations should and are intended to be comprehended within the meaning and range of equivalents of the following claims.

What is claimed as new and desired to be secured by Letters Patent is:

1. An arrangement for determining the temperature of an extrusion during the manufacturer thereof, comprising, in combination, extrusion means for extruding a given electrically conductive extrusion material, said extrusion means including an extrusion die having an outlet end from which the extruded material issues; a first thermocouple element, having thermoelectric properties different from that of the extrusion material, supported by said extrusion means closely adjacent to the extrusion material adjacent said outlet end of said die at a predetermined region of the latter and said first thermocouple element extending away from said extrusion means; an electrical conductor engaging and having substantially the same thermoelectric properties as the extrusion material; and means connected electrically with said conductor and said first thermocouple element for indicating the temperature of a point on the extrusion material at the region where said first thermocouple element terminates adjacent to said extrusion material, whereby the extrusion material itself forms the second thermocouple element.

2. Apparatus for measuring the temperature of an extrusion during the manufacture thereof, comprising, in combination, extrusion means for extruding an electrically conductive extrusion material, said extrusion means including a die having an irregular orifice through which the extrusion material flows to form an extrusion of non-uniform cross section and said orifice having an outlet end from which the extruded material issues; a first thermocouple element, having thermoelectric properties different from that of the extrusion material, connected with said extrusion means at said die thereof to be supported by said extrusion means, said first thermocouple element terminating adjacent said outlet end of said orifice closely adjacent to the extrusion material at that part of the die which gives to the extrusion material the smallest thickness thereof, said first thermocouple element having a free end located distant from the extrusion means; an electrical conductor connected electrically with and having substantially the same thermoelectric properties as the extrusion material and also having a free end distant from said extrusion means; and means interconnecting the free ends of said first thermocouple element and said conductor for indicating the temperature of a point on the extrusion material at that portion thereof which is adjacent to the end of the first thermocouple element carried by said die, whereby the extrusion material itself forms the second thermocouple element.

3. Apparatus for measuring the temperature of an extrusion during the manufacture thereof, comprising, in combination, extrusion means for extruding an electrically conductive extrusion material, said extrusion means including a die through which the extrusion material flows to form an extrusion of a given cross sectional configuration, said die having an outlet end from which the extruded material issues and said die being formed with a bore passing therethrough from the exterior thereof closely adjacent to said outlet end at a region through which the extrusion material flows; a tube located in said bore; an elongated first thermocouple element having thermoelectric properties different from that of the extrusion material, extending into and insulated from said tube and terminating closely adjacent to that end of the bore of said die which is next to the extrusion material, whereby a part of the extrusion material will flow into said latter end of said bore to contact the first thermocouple element, the latter having a free end located distant from said extrusion means; a conductor connected electrically with and having substantially the same thermoelectric properties as the extrusion material and also having a free end distant from said extrusion means; and means connected with the free ends of said first thermocouple element and said conductor for indicating the temperature of the extrusion material at the portion thereof which engages the first thermocouple element, whereby the extrusion material itself forms the second thermocouple element.

4. Apparatus for measuring the temperature of an extrusion during the manufacture thereof, comprising, in combination, extrusion means including an extruding die having an outlet end from which the extruded material issues, said extrusion means extruding an electrically conductive extrusion material; an elongated first thermocouple element having thermoelectric properties different from that of the extrusion material and having one end at a location next to said die at a predetermined point thereof adjacent said outlet end, said first thermocouple element having an opposite end distant from said extrusion means; fastening means fastening said one end of said first thermocouple element to said die at said location closely adjacent to the extrusion material which flows through the die; an electrical conductor connected with and having substantially the same thermoelectric properties as the extrusion material and having a free end distant from said extrusion means; and means connected electrically with said free end of said conductor and said opposite end of said first thermocouple element for indicating the temperature of the die at the point thereof to which the first thermocouple element is fastened, said point of said die being at the same temperature as the extrusion material, whereby the extrusion material itself forms the second thermocouple element.

5. Apparatus for measuring the temperature of an extrusion during the manufacture thereof, comprising, in combination, extrusion means for extruding an electrically conductive extrusion material, said extrusion means including an extrusion die having an outlet end from which the extruded material issues; a first thermocouple element, having thermoelectric properties different from that of the extrusion material, supported in part by said extrusion means and located directly next to the extrusion material adjacent said outlet end of said die at a predetermined region thereof; an electrical conductor having substantially the same thermoelectric properties as the extrusion material and having a free end located adjacent a free end of said first thermocouple element which is distant from said extrusion means; means for electrically connecting a part of said conductor distant from said free end thereof with the extrusion adjacent the leading end thereof as the extrusion is extruded and advances from the extrusion means; and means connected to the free end of said conductor and the end of said first thermocouple element distant from said extrusion means for indicating the temperature of the extrusion material at a point thereof located next to said first thermocouple element, whereby the extrusion material itself forms the second thermocouple element.

6. Apparatus for measuring the temperature of an extrusion during the manufacture thereof, comprising, in combination, extrusion means for extruding an electrically conductive material, said extrusion means including a die through which the extrusion material flows and said die having an outlet end from which the extruded material issues; a first thermocouple element having thermoelectric properties different from that of the extrusion material and having one end located closely adjacent to a predetermined point on the extrusion material at said die adjacent the outlet end thereof and having an opposite end distant from said extrusion means; an electrical conductor having substantially the same thermoelectric properties as the extrusion material and having a portion passing through said die and engaging the extrusion material at a part thereof next to said die, said electrical conductor having a free end distant from said extrusion means; and means connected with said free end of said electrical conductor and with said opposite end of said first thermocouple element for indicating the temperature of said predetermined point on the extrusion material closely adjacent to said one end of said first thermocouple element, whereby the extrusion material itself forms the second thermocouple element.

7. Apparatus for measuring the temperature of an extrusion during the manufacture thereof, comprising, in combination, extrusion means for extruding an electrically conductive extrusion material, said extrusion means including a die and a billet receiver connected with said die for feeding to the latter the extrusion material originally located in said receiver in the form of a billet, said die having an outlet end from which the extruded material issues; a first thermocouple element having thermoelectric properties different from that of the extrusion material and having one end located closely adjacent to a predetermined point on the extrusion material at said outlet end of said die and having a free end distant from said extrusion means; an electrical conductor having substantially the same thermoelectric properties as the extrusion material and passing through a wall of said billet receiver and engaging the extrusion material in said receiver, said conductor having a free end distant from said extrusion means; and means connected with said free end of said conductor and said free end of said first thermocouple element for indicating the temperature of the extrusion material at the predetermined point thereof adjacent to said one end of said first thermocouple element, whereby the extrusion material itself forms the second thermocouple element.

8. Apparatus for measuring the temperature of an extrusion during the manufacture thereof, comprising, in combination, extrusion means for extruding an electrically conductive extrusion material, said extrusion means including a die, a billet receiver which contains the extrusion material originally in the form of a billet, and a ram for advancing the extrusion material out of the receiver and through the die, said die having an outlet end through which the extruded material issues; a first thermocouple element having thermoelectric properties different from that of the extrusion material and having one end located closely adjacent to a predetermined point on the extrusion material at said outlet end of said die and having a free end located distant from said extrusion means; an elongated electrical conductor having substantially the same thermoelectric properties as the extrusion material and passing through a part of said ram and engaging the extrusion material, said conductor also having a free end distant from said extrusion means; and means connected electrically with the free ends of said conductor and first thermocouple element for indicating the temperature of the extrusion material at the predetermined point thereof next to said first thermocouple element, whereby the extrusion material itself forms the second thermocouple element.

References Cited in the file of this patent
UNITED STATES PATENTS

| | | |
|---|---|---|
| 1,379,909 | Gilbert | May 31, 1921 |
| 1,988,849 | McBurney | Jan. 22, 1935 |
| 2,102,955 | Hulme | Dec. 21, 1937 |
| 2,105,083 | Kagi et al. | Jan. 11, 1938 |
| 2,161,570 | Harris | June 6, 1939 |
| 2,658,687 | Southworth | Nov. 10, 1953 |